US008718616B2

(12) United States Patent
Pousti

(10) Patent No.: US 8,718,616 B2
(45) Date of Patent: May 6, 2014

(54) SYSTEMS AND METHODS FOR MANAGING CONTENT PROVIDED THROUGH A MOBILE CARRIER

(71) Applicant: SMS.ac, Inc., San Diego, CA (US)

(72) Inventor: Michael Pousti, San Diego, CA (US)

(73) Assignee: SMS.ac, Inc., San Diego ( * ) Notice: Subject to any disclaimer, the term of this patent is extended or adjusted under 35 U.S.C. 154(b) by 0 days.

(21) Appl. No.: 13/631,262

(22) Filed: Sep. 28, 2012

(65) Prior Publication Data

US 2013/0023251 A1 Jan. 24, 2013

Related U.S. Application Data

(63) Continuation of application No. 11/696,636, filed on Apr. 4, 2007, now abandoned.

(60) Provisional application No. 60/789,388, filed on Apr. 4, 2006.

(51) Int. Cl.
*H04M 3/42* (2006.01)

(52) U.S. Cl.
USPC ........ 455/414.1; 455/418; 455/406; 455/403; 709/217

(58) Field of Classification Search
USPC ................. 455/414.1, 418, 403, 403.04, 406; 709/225, 204, 217
See application file for complete search history.

(56) References Cited

U.S. PATENT DOCUMENTS

| 6,413,213 | B1 * | 7/2002 | Essenpreis et al. | 600/300 |
| 6,891,953 | B1 * | 5/2005 | DeMello et al. | 380/277 |
| 7,941,656 | B2 * | 5/2011 | Hans et al. | 713/2 |
| 2003/0139174 | A1 * | 7/2003 | Rao | 455/418 |
| 2004/0068431 | A1 * | 4/2004 | Smith et al. | 705/10 |
| 2005/0210102 | A1 * | 9/2005 | Johnson et al. | 709/204 |
| 2006/0136419 | A1 * | 6/2006 | Brydon et al. | 707/9 |
| 2006/0212537 | A1 * | 9/2006 | Hans et al. | 709/217 |
| 2007/0038567 | A1 * | 2/2007 | Allaire et al. | 705/50 |
| 2007/0185867 | A1 * | 8/2007 | Maga et al. | 707/6 |

* cited by examiner

*Primary Examiner* — Kashif Siddiqui
*Assistant Examiner* — Shahriar Behnamian
(74) *Attorney, Agent, or Firm* — Procopio, Cory, Hargreaves & Savitch LLP; Noel C. Gillespie

(57) ABSTRACT

A wireless network carrier can track and monitor third-party network-enabled applications (pods) that are accessed by, and billed to, users of the wireless network carrier through a mobile content platform, and to control access to such third-party network-enabled applications (pods) based on selectable criteria for the performance and user-based feedback related to each content application (pod). The network-enabled applications can also be registered with the mobile content platform through an intermediary, such as an aggregator. The network-enabled application can then be associated with the intermediary so that the intermediary receives a share of the revenue generated by the network-enabled application.

20 Claims, 18 Drawing Sheets

SYSTEMS AND METHODS FOR MANAGING CONTENT PROVIDED THROUGH A MOBILE CARRIER

RELATED APPLICATIONS INFORMATION

This application claims priority under 35 U.S.C. 120 to U.S. patent application Ser. No. 11/696,636, filed Apr. 4, 2007, entitled "Systems and Methods for Managing Content Provided Through a Mobile Carrier," which in turn claims priority under 35 U.S.C. 119(e) to U.S. Provisional Patent Application Ser. No. 60/789,388, filed Apr. 4, 2006, entitled "Content Application Manager," which are incorporated herein by reference as if set forth in full.

This Application is also related to U.S. patent application Ser. No. 11/516,921, filed Sep. 6, 2006, entitled "Automated Billing and Distribution Platform for Application Providers," which is also incorporated herein by reference as if set forth in full.

BACKGROUND INFORMATION

1. Field

The present invention relates to a method and system providing the capability for a wireless network carrier to track and monitor content applications (pods) that are accessed by, and billed to, users of the wireless network carrier, and to control access to such content applications (pods) based on selectable criteria for the performance and user-based feedback related to each content application (pod).

2. Background

The invention described in commonly-owned U.S. patent application Ser. No. 11/516,921, entitled "Automated Mobile Phone Billing and Distribution Platform for Application Providers," (the "'921 application"), is directed to a method and platform through which content application providers can easily and automatically connect to a common platform in order to offer access and use of their network-enabled applications (pods) to a global community of mobile phone users through a variety of different mediums, while automatically charging the user for use of the application through the user's billing account with the wireless network carrier to which the user subscribes. In this manner, the community platform described in the '921 application allows an application provider to commercially offer an application to a community of mobile phone users without the need for the application provider to have a contractual agreement with any of the wireless network carriers to which the mobile phone users respectively subscribe. Furthermore, the platform described in the '921 application provides application (pod) providers a simple and automatic way to register and present their applications for access, purchase and use by the global community by registering the applications in an automatic fashion that eliminates the need for a lengthy registration processing involving multiple layers of people and procedures.

According to the platform and methods described in the '921 application, an application provider can write an application pod and then register the pod with the community platform for automatic access to a community of mobile phone users via various wireless network carriers. For example, an application provider may design and develop an application pod that allows a user to view current stock prices for selected stocks in which the user is interested. The application provider would then register the completed "stock price" application pod with the community platform, after which the pod would be available for access, purchase and use by all mobile phone users that are members of the community.

A mobile phone user could then subscribe to use the "stock price" application pod through the community platform, after which the user could access and use the pod to check stock prices from within a typical web browser on a computer or on the user's mobile phone. As mentioned above with respect to the '921 application, the community platform automatically charges the user for use of (subscription to) the application pod through the user's existing billing account with the wireless network carrier to which the user subscribes.

Sometimes, difficulties arise with the access and use of third-party application pods by users of a wireless network carrier, whether through the internet or through the user's mobile phone, because the third-party application pods offered for billing through the wireless network carrier may have various, inconsistent types of pricing models. This results in lack of clarity to a user of such pods, thereby leading to unexpected and/or unwanted billed charges on the user's account with the wireless network carrier. Also, some third-party application pods may not deliver the service or product that was expected when the user agreed to pay for (opt in to) the application pod. These problems can cost the wireless network carrier a substantial amount of time and money to deal with. For example, the wireless network carrier may need to handle a large volume of user complaints regarding the billing methods and the quality of certain third-party application pods that are billed to users through the wireless network carrier. Furthermore, these complaints may lead to the wireless network carrier having to credit substantial amounts to users' bills in order to offset billing by third-party application pods that have applied unclear and inconsistent pricing models and which have delivered low quality product/services to users, or none at all.

In addition, the delivery of low quality product/service and the unexpected billing to the user's accounts by various third-party application pods may provide a bad image to the wireless network carrier through which such application pods are offered, and may lead users to cancel their service account with that wireless network carrier and subscribe to another wireless network carrier. In order for a wireless network carrier to proactively monitor the billing practices and the quality of content provided by the numerous and various third-party application pods offered through the wireless network carrier, the wireless network carrier would have to constantly review the pricing model offered by each application pod and also constantly review the content provided by each application pod to determine whether the application pod is providing content (product or service) of an acceptable quality to users of the wireless network carrier.

Proactive monitoring of all third-party application pods offered through the wireless network carrier can cost significant expenditures of manpower and money by the wireless network carrier. Also, when "problem" third-party application pods are identified, the wireless network carrier would need to deal individually with each third-party that operates the application pod to convince them to remedy the problem, or then cancel the access and use of the third-party application pod through the wireless network carrier, which also requires significant time and expense on the part of the wireless network carrier.

Accordingly, a wireless network carrier needs a way to easily and efficiently monitor third-party content applications (pods) that are accessed by, and billed to, users of the wireless network carrier, and to control access to such third-party content applications (pods) based on selectable criteria for the performance and quality of each content application (pod).

SUMMARY

The present invention generally provides a way for a wireless network carrier to track and monitor third-party network-enabled applications (pods) that are accessed by, and billed to, users of the wireless network carrier, and to control access to such third-party network-enabled applications (pods) based on selectable criteria for the performance and user-based feedback related to each content application (pod).

In one embodiment of the invention, a system and method are provided that allow each of many mobile service providers to access a community platform through which the wireless network carrier can view all third-party application pods that are offered through that wireless network carrier, monitor the use of each application pod and the pricing model of each application pod, and the revenue generated by each application pod. In addition, the present invention allows the wireless network carrier to control the type of pricing model used by each third-party application pod and the consistent display of such pricing model to the users, along with the enforcement of the pricing model when the application pod bills users through the wireless network carrier. The present invention also allows the wireless network carrier to disconnect a third-party application pod from being accessed by users of the wireless network carrier based on monitored user feedback and comments related to the third-party application pod in comparison to quality sensitivity criteria set by the wireless network carrier.

In other embodiments, the present application also provides the capability for the wireless network carrier to automatically control the amount of marketing exposure (advertising) of each application pod to users of the wireless network carrier. For example, the wireless network carrier can increase the amount of advertising of a particular application pod to a user on a user's displayed web page, if that application pod is growing in popularity and meets acceptable billing and quality criteria set by the wireless network carrier.

In this manner, the wireless network carrier can efficiently and inexpensively for a wireless network carrier track and monitor third-party content applications (pods) that are accessed by, and billed to, users of the wireless network carrier, and to control access to, and billing practices of, such third-party content applications (pods) based on selectable criteria for the performance and user-based feedback related to each content application (pod).

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which:

FIGS. 3-12 are screen shots illustrating how the functions of FIG. 2 can be presented to a user;

DETAILED DESCRIPTION

The aforementioned '921 application provides a thorough description of a community platform for access by users of many different wireless network carriers that allows the users to efficiently and effectively form a virtual community for communication, sharing, and access to a large number of third-party application pods that provide services and products to users of the community platform, where the third-party application pods are developed and operated by third-parties and then integrated with the community platform.

Figure 2:
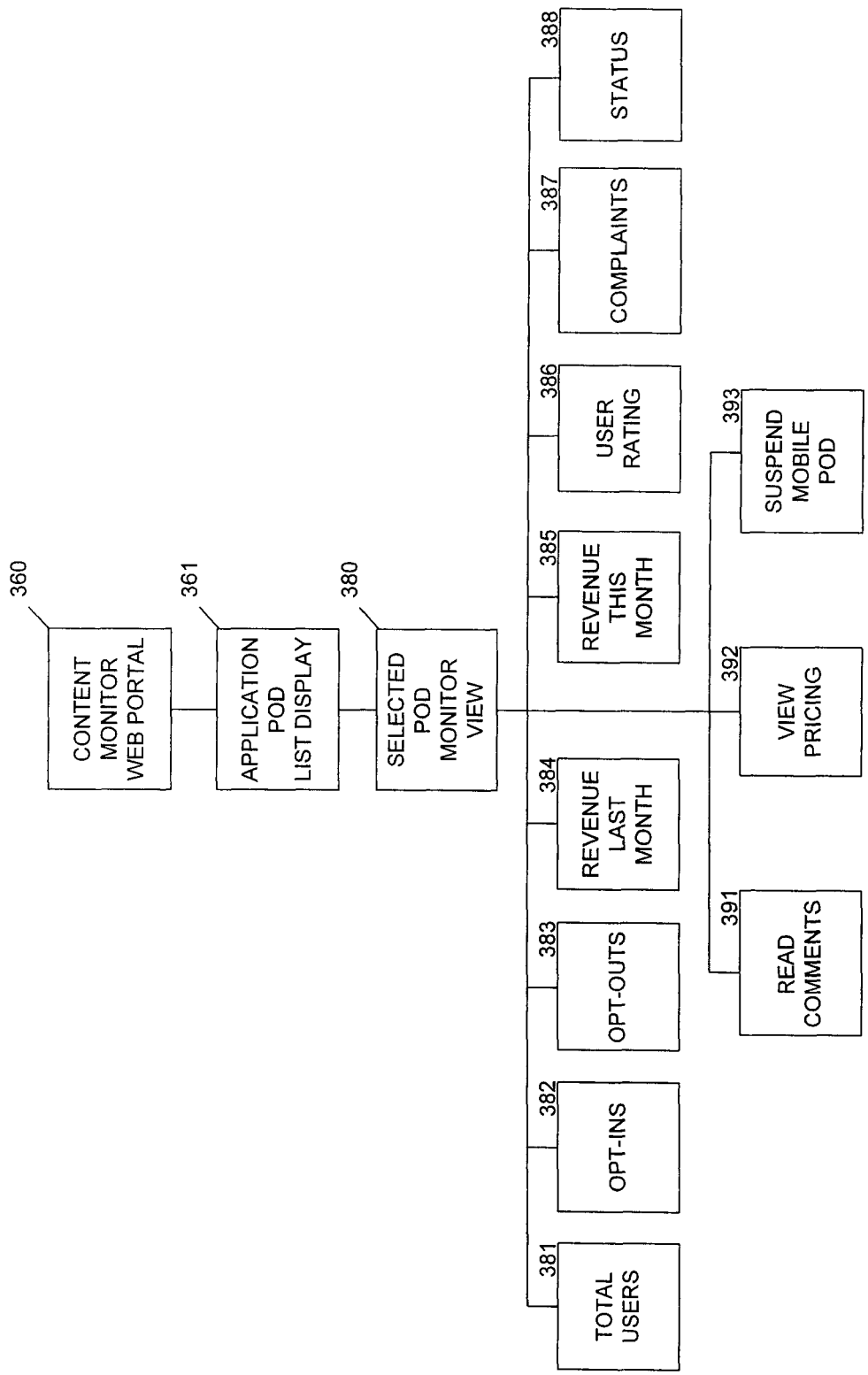
FIG. 2 is a diagram illustrating the functions that can be made available via the content manager of FIG. 1 in accordance with one embodiment.
Figure 13:
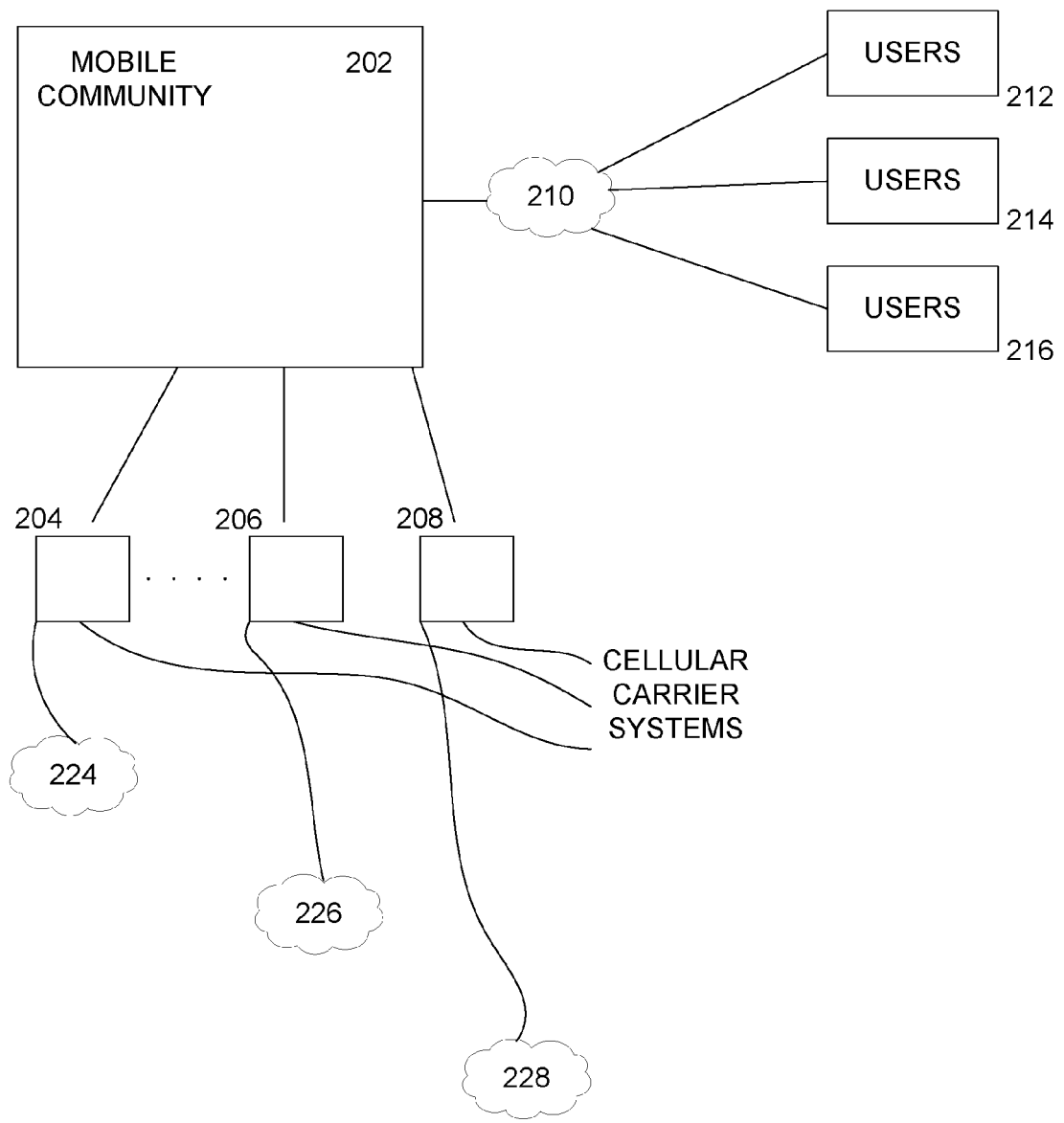
FIG. 13 is a diagram illustrating an example mobile community platform in accordance with one embodiment.

Referring to FIG. 2 of the '921 application, included herein as FIG. 13, a mobile community 202 is accessible to users 212-216 through the internet 210 or to users 224-228 through their respective cellular carrier systems 204-208. In this manner, users of mobile community 202 can access applications and services provided through mobile community 202 either through their mobile phones or through their computer browsers.

Figure 3:
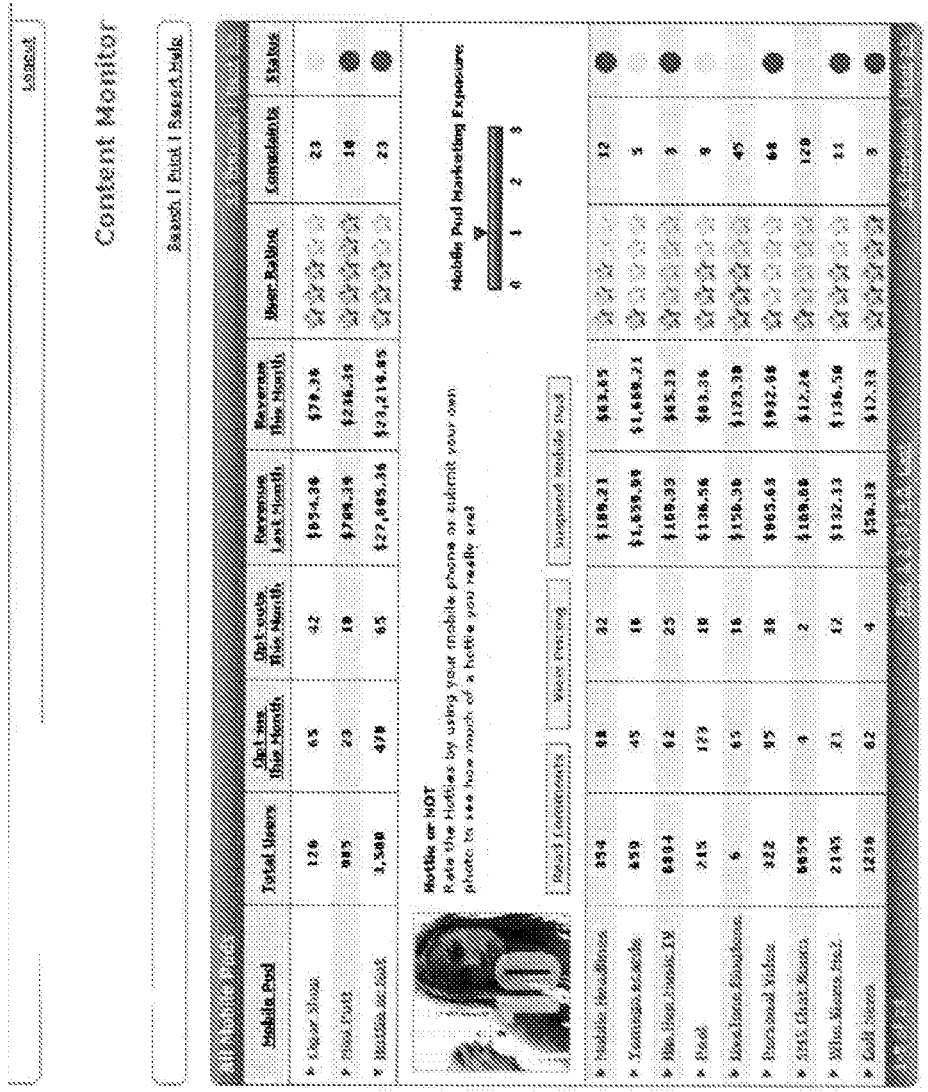
Figure 14:
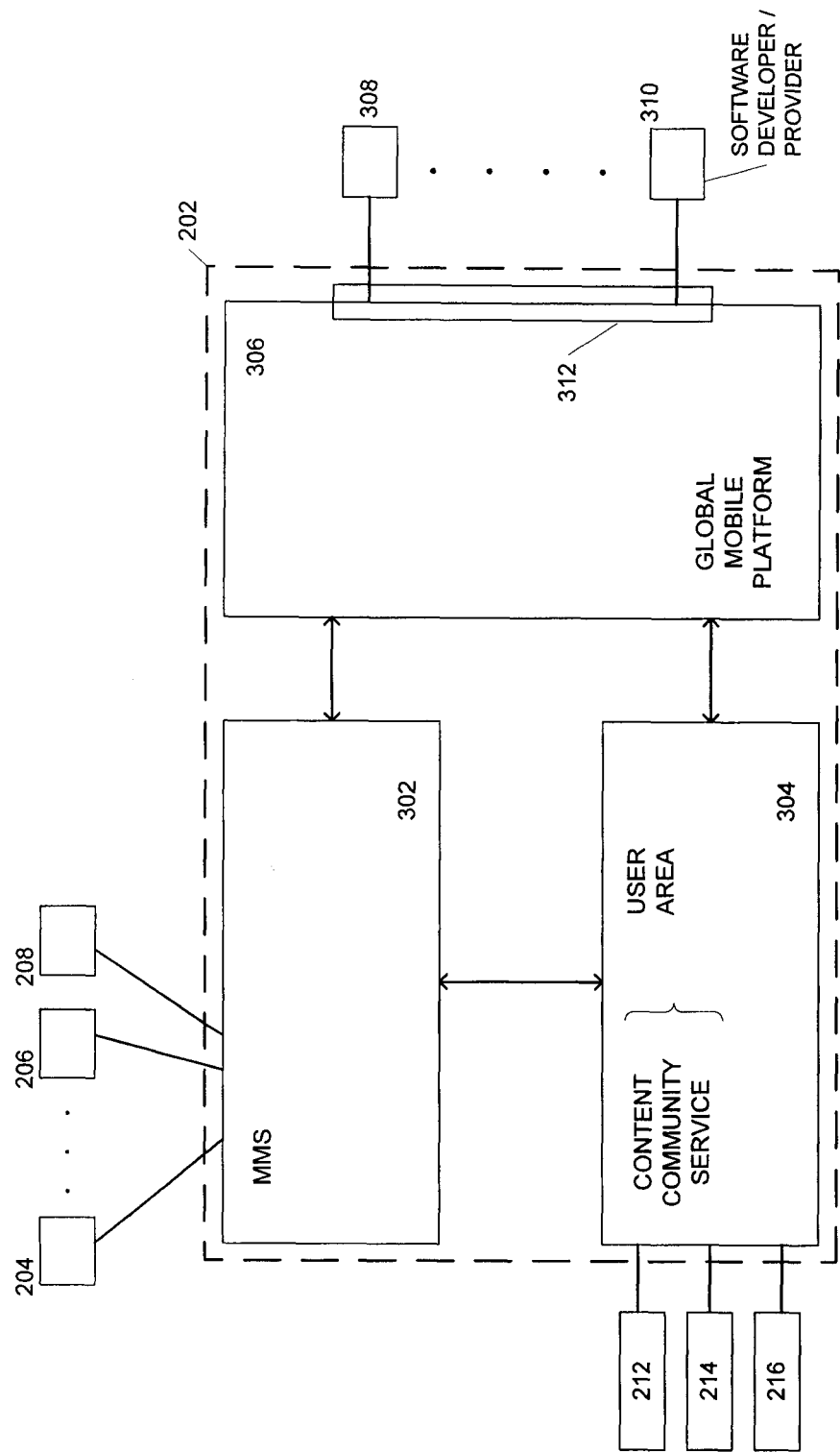
FIG. 14 is a diagram illustrating the mobile community platform of FIG. 13 in more detail.

Referring to FIG. 3 of the '921 application, included herein as FIG. 14, an architecture is depicted which allows application developers to register their application pods with the community platform of the mobile community 202 for access, purchase and use by users of mobile community 202. Briefly, mobile community 202 shown in FIG. 14 includes global mobile platform 306, user area 304 where the content, community and commerce functions are handled for the users, and a multimedia messaging system 302. Users 212, 214, 216 can visit the user area 304 to participate in an on-line community that includes various content and commerce opportunities. This is typically accomplished via a user's web browser that may be hosted on a laptop or desktop computer, or, in the alternative, even on the user's mobile device such as a PDA or mobile phone. Thus, user area 304 includes a web server that communicates with users 212, 214, 216 and includes a data store of user information and other content. With these resources, mobile community 202 presents to a user 212 a profile page ("home page") that reflects content and information associated with, and desired by, that particular user. This content and information is not maintained on the local computer being used by the user 212 but, rather, is maintained and managed by the computer systems within the user area 304.

Multimedia messaging system 302 includes applications for connecting with and communicating with the multiple different wireless network carriers 204, 206, 208 that have been partnered with the platform of mobile community 202. MMS 302 is configured to generate message requests in the appropriate format for each of the wireless network carriers 204, 206, 208 including tariff information that determines the amount for which the recipient of the message will be charged. Upon receipt of the message request, the wireless network carriers 204, 206, 208 will use the information in the request to generate an appropriate message to the intended recipient/subscriber of the cellular carrier and then bill the recipient/subscriber's cellular service account for the specified amount.

MMS 302 communicates with the user area 304, such that users of the mobile community 202 can advantageously use the connectivity of MMS 302 with the carriers in order to send messages to subscribers of any of the wireless network carriers 204, 206, 208. The messages may be SMS messages, MMS messages, or other message formats that are subsequently developed. Some of these messages may have zero tariff and, therefore do not generate a bill (other than the underlying charges implemented by the cellular carrier) and others may have non-zero tariffs resulting in a billing event for the recipient. Mobile users can also communicate via MMS 302 with user area 304 to access the content, community and commerce offered though mobile community 202.

Global mobile platform 306 provides a link between third-party software developers/providers 308, 310 and mobile community 202. In particular, by using an interface 312, a third-party software provider 308, 310 may offer services and products to users 212, 214, 216. Advantageously for the software provider 308, 310, the global mobile platform 306 also provides automatic and instant connectivity to the MMS 302 and the wireless network carriers 204, 206, 208, and their users. Accordingly, the third-party software provider 308, 310 can interact with all users of the mobile community 202 whereby billable transactions with users 212, 214, 216 are automatically billed via the billing systems of the wireless network carriers 204, 206, 208. Furthermore, and importantly, this capability is available to the third-party software provider 308, 310 without requiring the software provider 308, 310 to negotiate or contract with any cellular carrier for billing arrangements, or to worry about how to communicate with a cellular carrier's systems and resources. The software provider seamlessly takes advantage of the unified set of connectivity and billing arrangements that exist between the mobile community 202 and the wireless network carriers 204, 206, 208. Thus, in addition to the contractual arrangements and affiliations the mobile community 202 has in place with different wireless network carriers 204, 206, 208, the underlying technical and communications infrastructure is also in place to communicate with and interoperate with each of the different wireless network carriers 204, 206, 208. As a result, application pod vendors and other members of the mobile community may interface with and operate with any of a variety of different carriers without difficulty. While some applications that are available to users 212, 214, 216 may be hosted in the user area 304, the global mobile platform 306, or elsewhere in the community 202, it is often the case that the third-party developer/provider 308, 310 will host their own application at their own remote location.

It should be noted that mobile platform 202 can also provide billing services through a variety of payment systems. In other words, the billing events generated in the system are not necessarily limited to mobile billing events. Rather, mobile platform can have agreements with a variety of different payment and transaction systems and allow providers 308, 310 to benefit from these arrangements without the need to have arrangements of their own. This can enable providers 308, 310 to reach an even wider pool of potential customers. Co-pending U.S. patent application Ser. No. 11/605,203, filed Nov. 27, 2006, and entitled "System and Method for Verification of Identity for Transactions," which is incorporated herein by reference as if set forth in full, describes various methods for registering users for various payment services and verifying the users when a billing event is generated.

Figure 9:
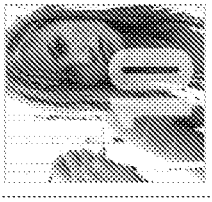
Figure 15:
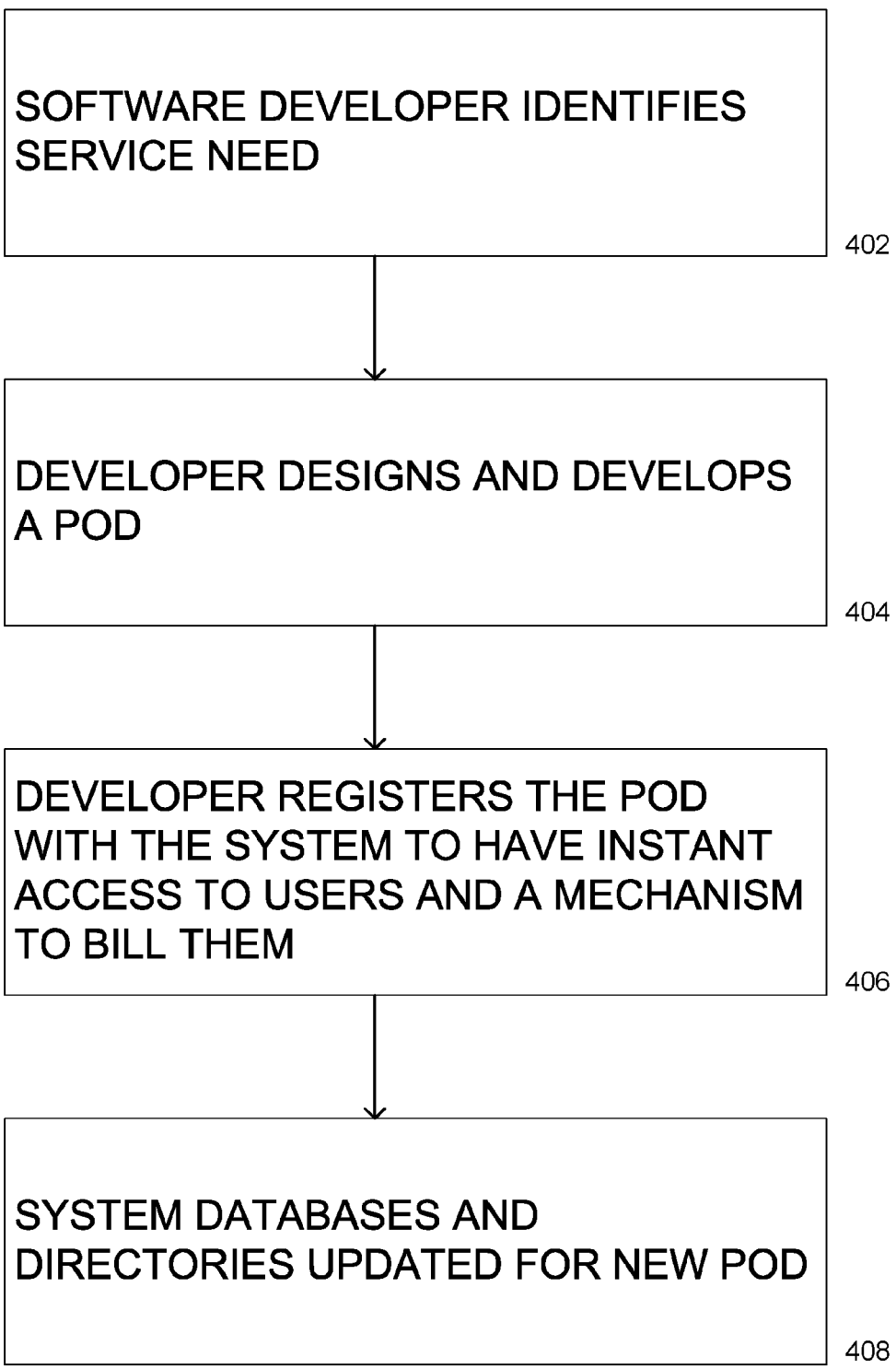
FIG. 15 is a flow chart illustrating an example process by which a content provider can create and register a mobile application pod with the mobile community platform of FIG. 13 in accordance with one embodiment.

FIG. 4 of the '921 application, included herein as FIG. 15, depicts a flowchart showing the basic steps through which a third-party application pod developer takes advantage of the community and billing resources offered by the mobile community. First, the application developer identifies a service need (such as a stock price information service, for example) in step 402, and then the application developer designs and develops an application pod for the desired service (step 404). In step 406, the developer registers the pod with the community through global mobile platform 306 to make the pod available to users of mobile community 202 for purchase and use. Once registered, the system databases and directories of mobile community 202 are updated to accommodate the new pod for access, billing, and other purposes (step 408). An example of an application pod developed by a developer and registered with mobile community 202 is shown in FIG. 9 of the '921 application, included herein as FIG. 16, and a depiction of a user's home page is shown in FIG. 10 of the '921 application, included herein as FIG. 17, in which it can be seen that the user's home page contains several application pods to which the user has subscribed.

As mentioned above, the present invention of this application is directed to providing an efficient and inexpensive way for a wireless network carrier to track and monitor third-party content applications (pods) that are accessed by, and billed to, users of the wireless network carrier, and to control access to, and billing practices of, such third-party content applications (pods) based on selectable criteria for the performance and user-based feedback related to each content application (pod).

Figure 1:
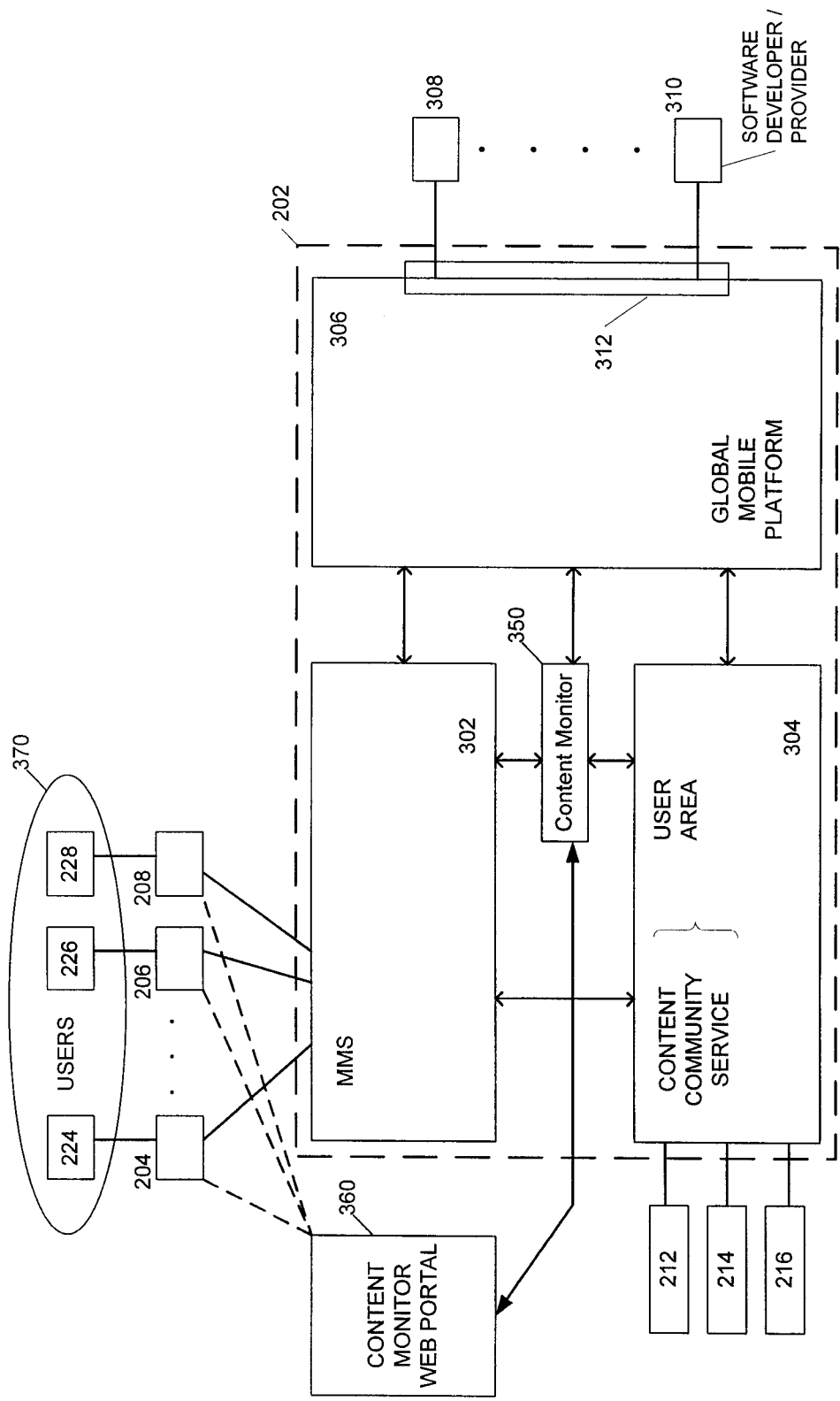
FIG. 1 is a diagram illustrating an example mobile community platform that includes a content monitor configured in accordance with one embodiment.

FIG. 1 of the present application is a block diagram that depicts the integration of a content monitor functionality into the community-based architecture discussed above with respect to FIGS. 13 and 14 in which third-party application developers register their application pods with the community platform of the mobile community for access, purchase and use by users of the mobile community, and for automatic billing to the wireless network carrier account of a user when that user purchases (opts into) and uses an application pod. In this regard, the components of FIG. 1 are similar to those shown in FIGS. 13 and 14, with the exception of the additional components that provide the content monitor functionality.

As seen in FIG. 1, the community platform based architecture is shown in which third-party application pods 308-310 are integrated into the community 202 through global community platform 306. The application pods can then be accessed and purchased for use by users 370 (including users 224 to 228) of wireless network carriers 204 to 208, respectively. Content monitor 350 is shown in FIG. 1 to be integrated into the architecture such that it is in communication with MMS 302, user area 304 and global mobile platform 306. In this way, content monitor 350 can provide information regarding the use, billing structure and performance of each application pod to a wireless network carrier, and can also control a user's access to, and purchase of, an application pod. Content monitor 350 can be a program or set of executable instructions that can be executed on a computer or server, either along with the other components shown in community 202 of FIG. 1, or separately, but in communication with the other components of community 202.

In one embodiment, the functionality of content monitor 350 is accessed by mobile service providers 204 to 208 through content monitor web portal 360. In this regard, content monitor web portal 360 is a secure website developed and maintained by community 202 for secure access by mobile service providers 204 to 208. Content monitor web portal 360 can be accessed through, e.g., a networked computer, such as a typical personal computer or workstation with network access to the internet.

FIG. 2 is a block diagram that explains the functionality of content monitor 350 of FIG. 1, e.g., when accessed through content monitor web portal 360. As seen in FIG. 2, one of mobile service providers 204 to 208 accesses content monitor web portal 360 by providing a secure identification, such as an identifier code and a password. Once logged into content monitor web portal 360, an application pod list display 361 is provided which lists all application pods that are offered to users through the specific mobile service provider that is logged into content monitor web portal 360. An example of application pod list display 361 is shown in the screen shot of FIG. 3, and shows a listing of all application pods offered through the mobile service provider, along with various data fields in the row corresponding to each application pod. Each of these various data fields is discussed in more detail below.

From application pod list display 361, a user can click on one of the listed application pods to bring up a selected pod monitor view 380. An example of selected pod monitor view 380 also shown in the middle of the screen shot of FIG. 3, for application pod "Hottie or NOT." As can be seen, a selected pod monitor view 380 can include a mobile marketing exposure control bar that can be configured to allow the mobile service provider to control how often the specific application pod is advertised to the users of the mobile service provider when users are accessing user area 304 of community 202. Selected pod monitor view 380 also includes a "Read Comments" button, a "View Pricing" button, and a "Suspend Mobile Pod" button, each of which is described further below.

Figure 5:
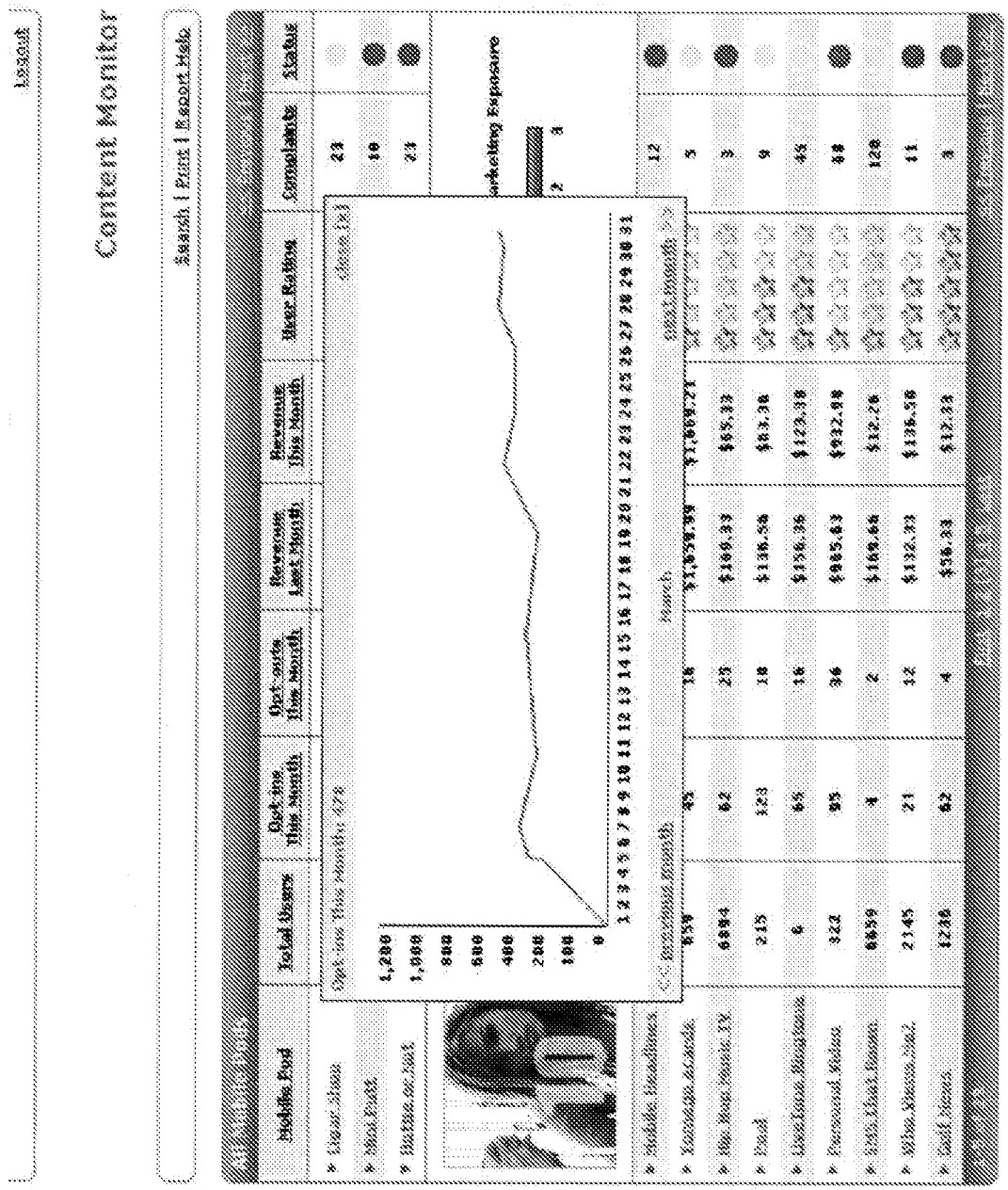
Figure 6:
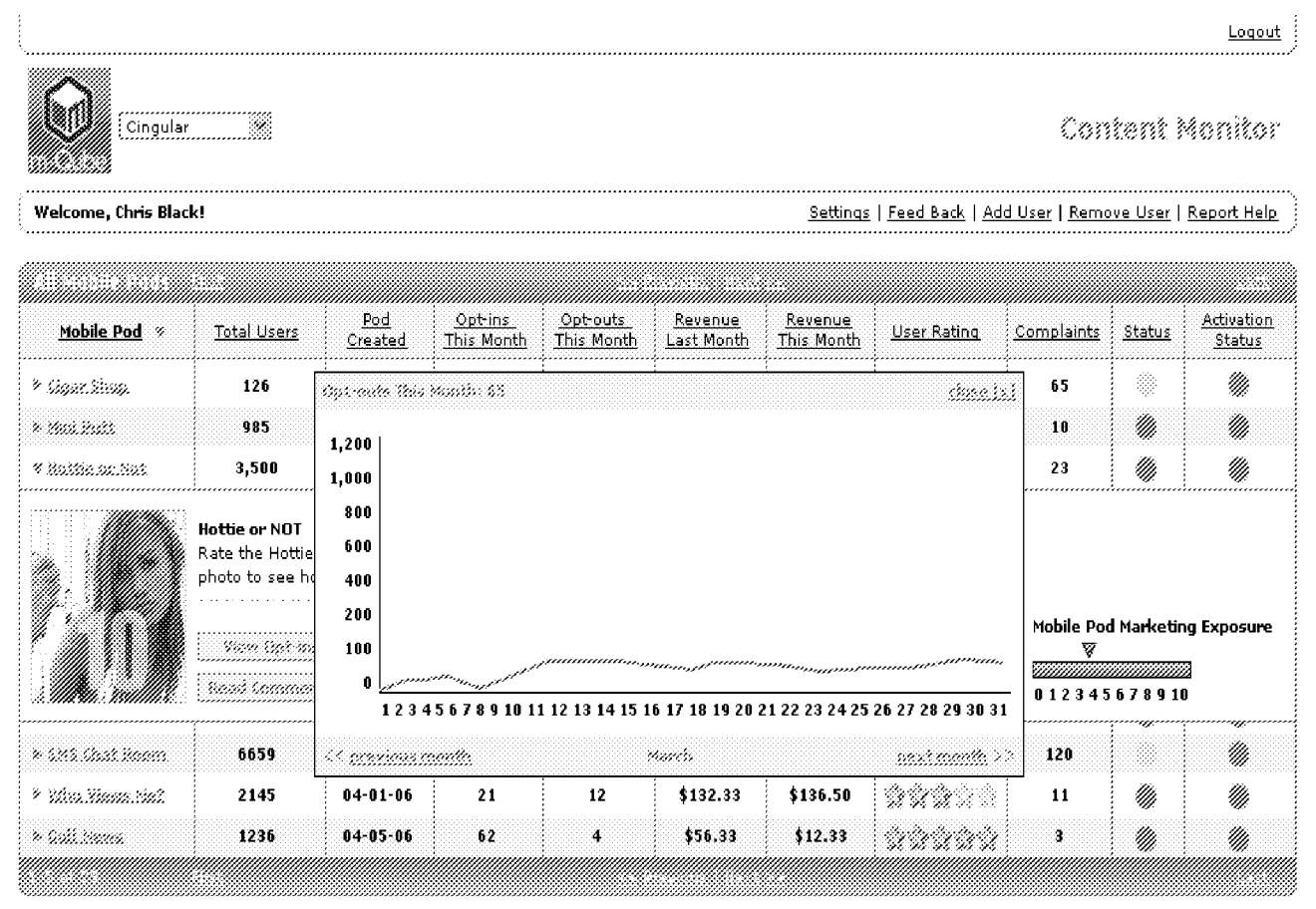

Returning to FIG. 2, each of the various data field functions 381 to 388 are shown. In certain embodiments, a display of the data field function pops-up when the mouse is pointed over that field function in the row of the corresponding application pod, e.g., in the list display of FIG. 3. "Total Users" function 381 can allow the mobile service provider to see the total number of users that have currently purchased (opted into) the selected application pod. An example of a display of the "Total Users" is shown in the screen shot of FIG. 4. "Opt-ins" function 382 can allow the mobile service provider to see the number of users that have opted into (purchased) the selected application pod during the current month. An example of a display of the "Opt-ins" is shown in the screen shot of FIG. 5. "Opt-outs" function 383 can allow the mobile service provider to see the number of users that have opted out of (canceled) the selected application pod during the current month. An example of a display of the "Opt-outs" is shown in the screen shot of FIG. 6.

In certain embodiments, the user does not necessarily opt-in/opt-out as those terms may normally be defined. Rather, the terms opt-in/opt-out can be used more generically to refer to the simple activation/de-activation of a pod, regardless of the actual mechanism for activating/de-activating.

Figure 7:
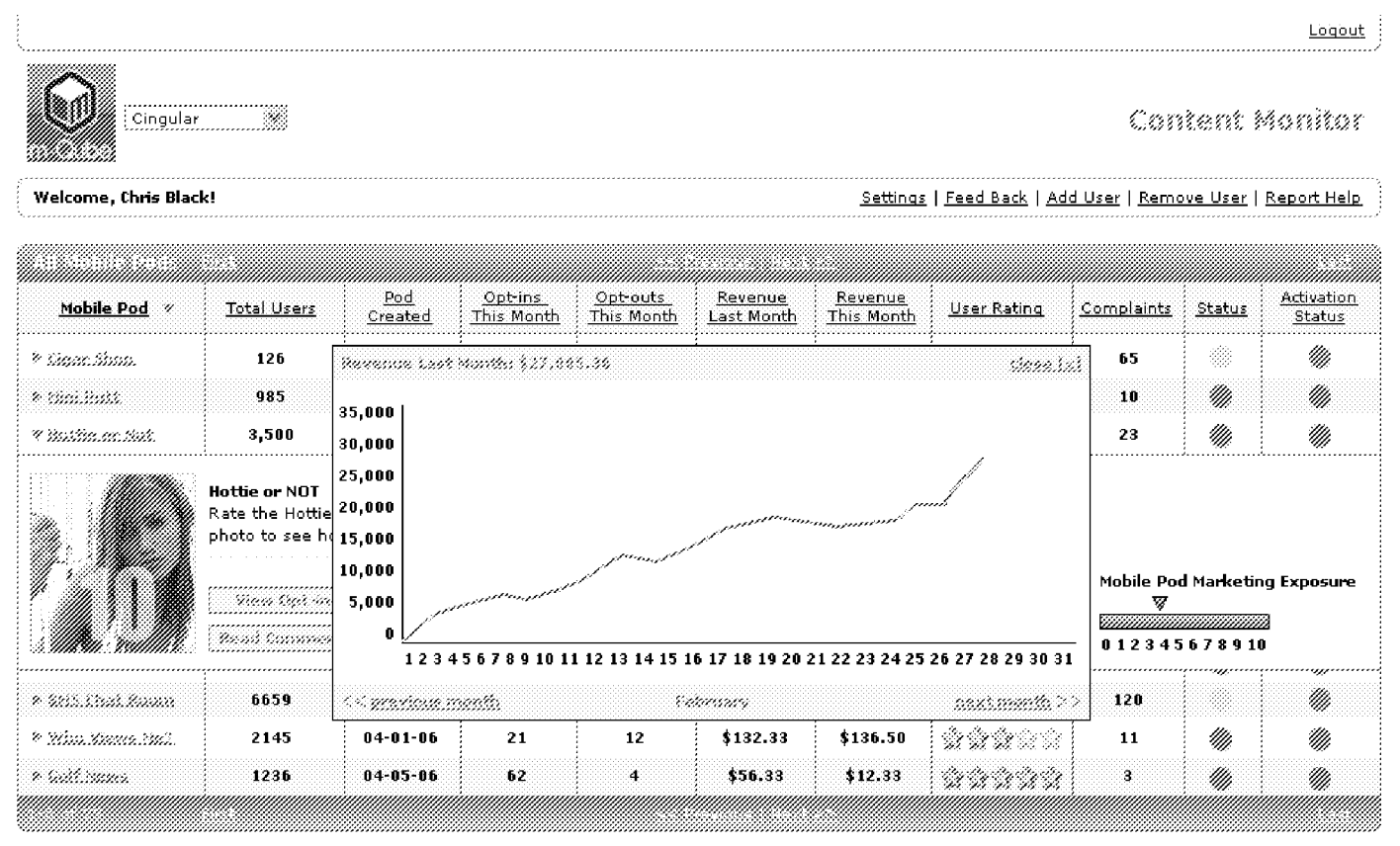
Figure 8:
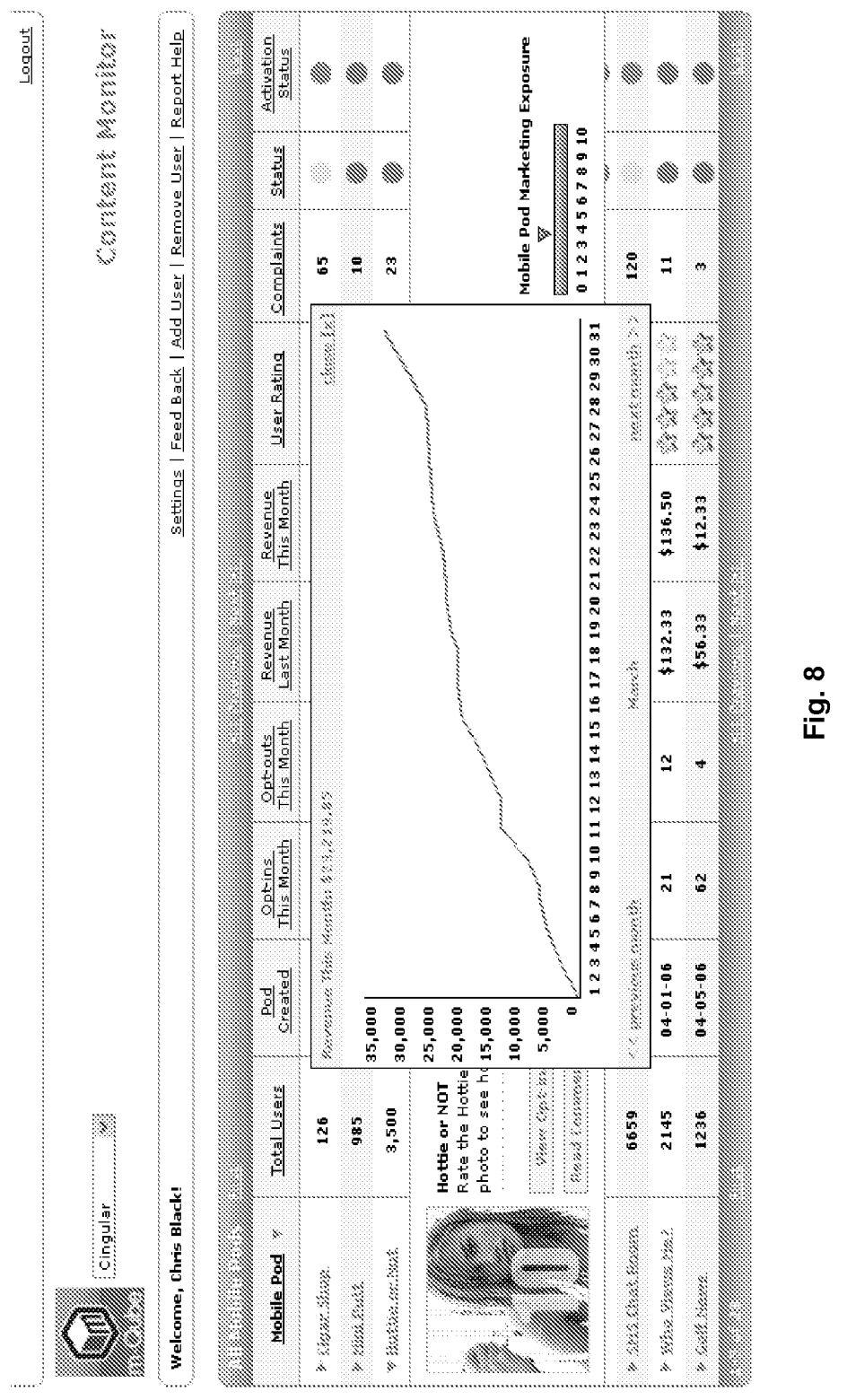

"Revenue Last Month" function 384 can allow the mobile service provider to see the total amount of revenue billed by the selected application pod through the mobile service provider for the last (previous) month. An example of a display of the "Revenue Last Month" is shown in the screen shot of FIG. 7. "Revenue This Month" function 385 can allow the mobile service provider to see the total amount of revenue billed by the selected application pod through the mobile service provider for this (current) month. An example of a display of the "Revenue This Month" is shown in the screen shot of FIG. 8. "User Rating" function 386 can allow the mobile service provider to see the composite user rating based on rating input from the users in the community that use the selected application pod, and is shown in the form of one-to-five stars, as indicated for each application pod in the screen shot of FIG. 3.

"Complaints" function 387 can allow the mobile service provider to see the total number of complaints related to the selected application pod as provided by users in the community that use the selected application pod, as indicated for each application pod in the screen shot of FIG. 3. For example, FIG. 15 of the '921 application is a flow chart illustrating an example method for instituting a complaint department within mobile community 202. In exemplary embodiments, the mobile service provider can also read the subject complaints for a selected application pod. Lastly, "Status" function 388 can allow the mobile service provider to track and monitor the performance of the selected application pod, and to control access and purchase of the selected application pod based on criteria selected by the mobile service provider for the selected application pod. The current status of the selected application pod is shown in the row corresponding to the application pod, as seen in FIG. 3, and the status is depicted by a colored button, such as green for "good," yellow for "warning," and red for "suspension". In this way, the mobile service provider can easily see if there is a problem with a specific application pod or if the application pod needs to be suspended so that users of mobile service provider can no longer access or purchase the application pod.

Figure 11:
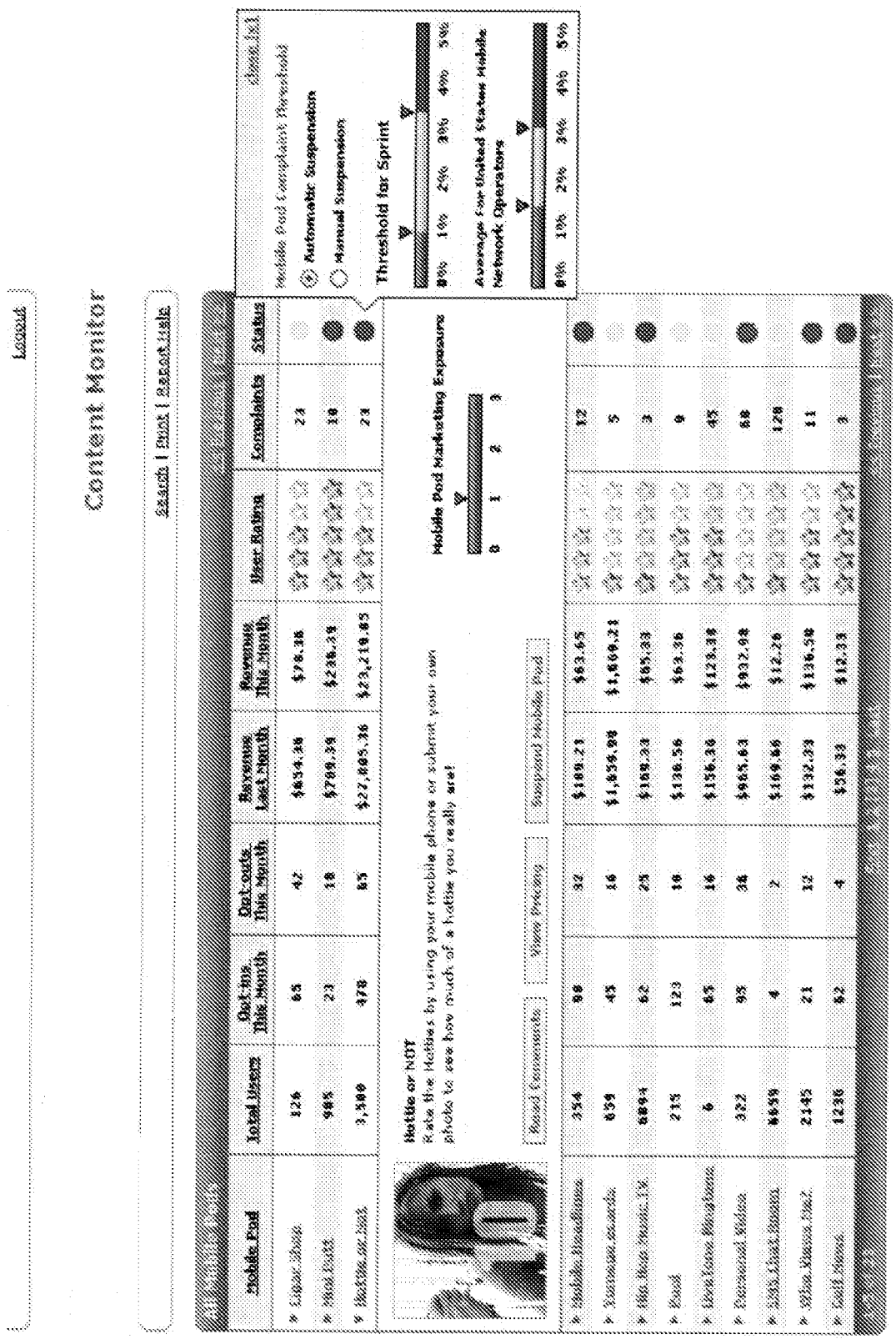

The colored status indicators of "Status" function 388 are based on the number of complaints from users of the selected application pod, in comparison, e.g., to a selected sensitivity (threshold) criteria set by the mobile service provider. In this regard, an example of a display of the "threshold" setting of the "Status" function is shown in the "threshold" pop-up box in the right side of the screen shot of FIG. 11. As seen in FIG. 11, the buttons are provided for "Automatic Suspension" or "Manual Suspension", which the mobile service provider can select depending on whether it is desired for content monitor 350 to automatically suspend an application pod that has a number of complaints exceeding a set threshold, or whether content monitor 350 is simply to warn the mobile service provider that the threshold has been exceed by turning the status indicator to red, and then the mobile service provider must manually suspend the application pod, as described below.

Also provided in the "threshold" pop-up box shown in FIG. 11 is a "threshold" setting bar which allows the mobile service provider to set the level of user complaints (based on percentage of users that purchased the application pod) required as a threshold for the status indicator to turn from green (good standing) to yellow (warning), and from yellow (warning) to red (suspend). In this manner, the mobile service provider can decide how strictly they want to control the quality of application pods that are offered to users through the mobile service provider.

Also provided in the "threshold" pop-up box is an average "threshold" bar which displays the average threshold levels set for all mobile service providers in a given region, such as the United States. This allows a specific mobile service provider to see how all other mobile service providers are controlling access to, and purchase of, a specific application pod. Based on the aforementioned thresholds and button settings set by the mobile service provider in the "threshold" pop-up box, the status indicator is shown in application pod list display 361 is set to the appropriate color according to the number of complaints received in community 202 from users of the selected application pod. If the threshold for suspension is crossed based on the number of complaints, the status indicator is set to "red", and the application pod is automatically suspended from access and use by content monitor 350 if "automatic suspension" button has been set by the mobile service provider. Otherwise, the mobile service provider must notice the red status indicator and then manually suspend the application pod. Either way, when an application pod is suspended, content monitor 350 coordinates with global mobile platform 306 and user area 304 to prevent the suspended application pod from being accessed and purchased by users of the mobile service provider (carrier).

It should be noted that the threshold should be based on reasonable percentage as oppose to say an overall number of complaints. Clearly a pod that generates millions of messages will often also generate more complaints than say a pod that generates a few thousand messages; however, the percentage may be much lower. For example, a pod that generates one million messages may generate 10,000 complaints. But this means that a complaint is generated only 1% of the time. If the pod only generates one hundred thousand messages, then the same 10,000 complaints would represent a 10% complaint rate. Clearly the second example is more of a problem than the first. Therefore, thresholds based on a percentage or rate of complaints can be more useful than thresholds based on volume of complaints. In certain embodiments, however, the raw number of complaints can be used either alone or in combination with a rate analysis.

In other embodiments, the number of opt-outs, or de-activations can also be used to determine whether to suspend a certain pod with respect to a certain carrier and/or, as explained below, a certain aggregator. For example, in certain embodiments, a opt-out/de-activation threshold can be set that when crossed causes content monitor 350 to automatically suspend the pod for the specific carrier. Further, the status indication can also be generated based on the number of opt-outside-activations. If automatic suspension is not enabled, then the status indicator can alert the carrier to the situation so that the carrier can make a determination regarding manual suspension based on the rate of opt-outs/de-activations. In other embodiments, the status indicator and/or automatic suspension can be based on a combination of complaints and opt-outs.deactivations.

Figure 12:
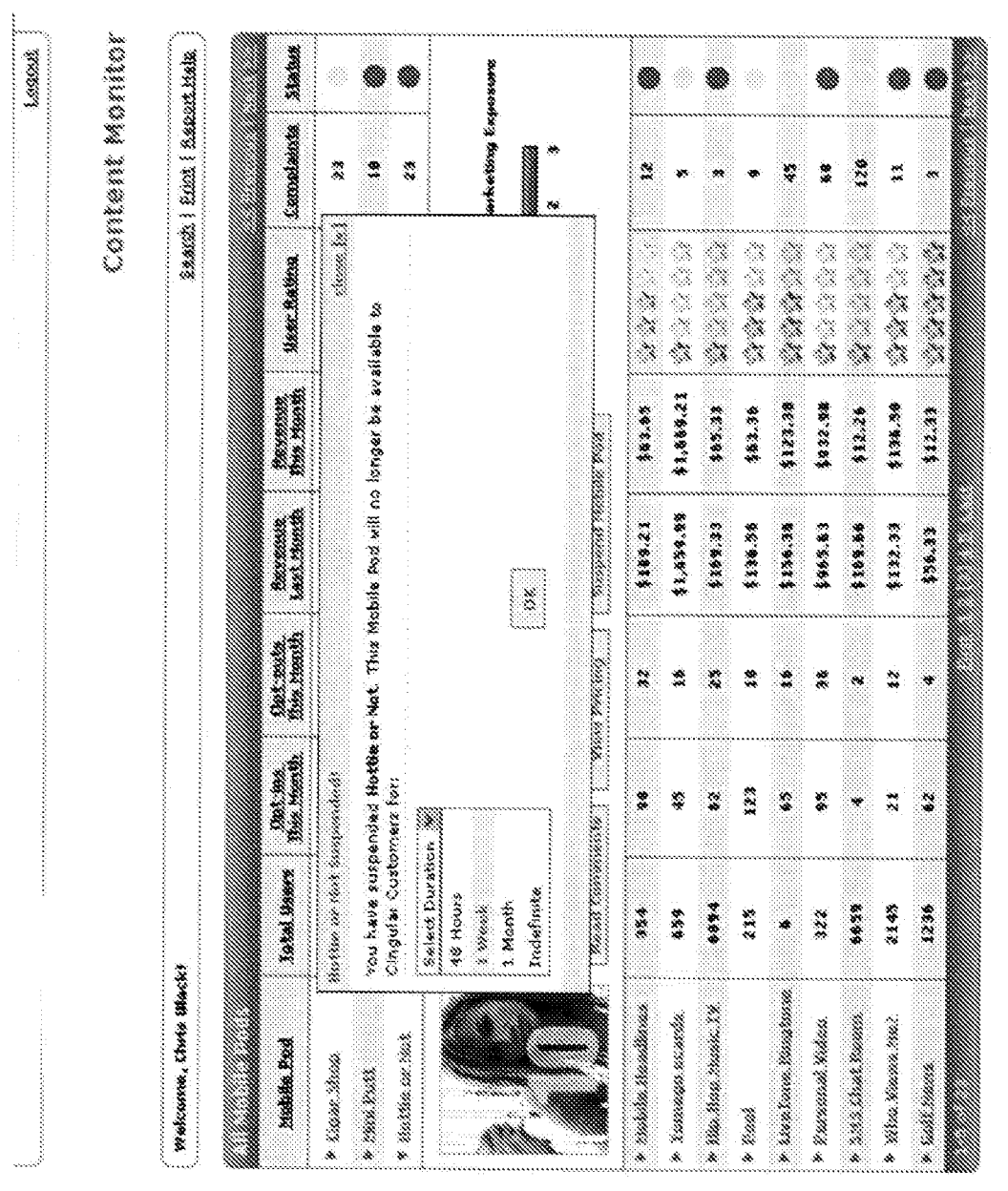

Returning to FIGS. 2 and 3, the "Read Comments" button function 391 of selected pod monitor view 380 can allow the mobile service provider (carrier) to view all comments entered by users of the selected application pod, as shown in FIG. 9. Similarly, the "View Pricing" function 392 of selected pod monitor view 380 can allow the mobile service provider (carrier) to view the pricing model of the selected application pod, along with information of the third party that operated the selected application pod. This allows the mobile service provider to ensure that the pricing model and information is in the correct format as presented to users, and to ensure that it is fair and clear, as shown in FIG. 10. Lastly, the "Suspend Mobile Pod" function 393 of selected pod monitor view 380 can allow the mobile service provider (carrier) to suspend an application pod from use for any reason, such as when the status indicator is red in the status display of the selected application pod in the application pod list display 361. FIG. 12 shows an example of a "Suspend Mobile Pod" pop-up display that can be displayed upon operation of the "Suspend Mobile Pod" button of selected pod monitor view 380. As seen in FIG. 12, the mobile service provider can elect to suspend the application pod from service through the mobile service provider for a specific amount of time, such as one day, one week, or one month, or indefinitely.

Thus, as described above, a mobile carrier can control the content provided to its customers through mobile platform 202 in a manner that cuts down on complaints and increases customer satisfaction; however, as will be understood there is often a middle man involved when it comes to providing content to mobile users. These middlemen are often referred to as "Aggregators." For example, it is well understood that short codes associated with SMS messaging are actually managed by an Aggregator. When a mobile user sends a message using a short code, the message, and any reply, are routed through the Aggregator's system. The Aggregator is then in charge of collecting all fees associated with the message and forwarding the respective shares, e.g., to the associated carrier and the service/content provider associated with the short code. The Aggregator also makes a small transaction fee for handling each message. Other intermediaries, such as transaction processors, e.g., Paypal or a bank, can also perform some or all of the functions of an aggregator as described herein.

Figure 18:
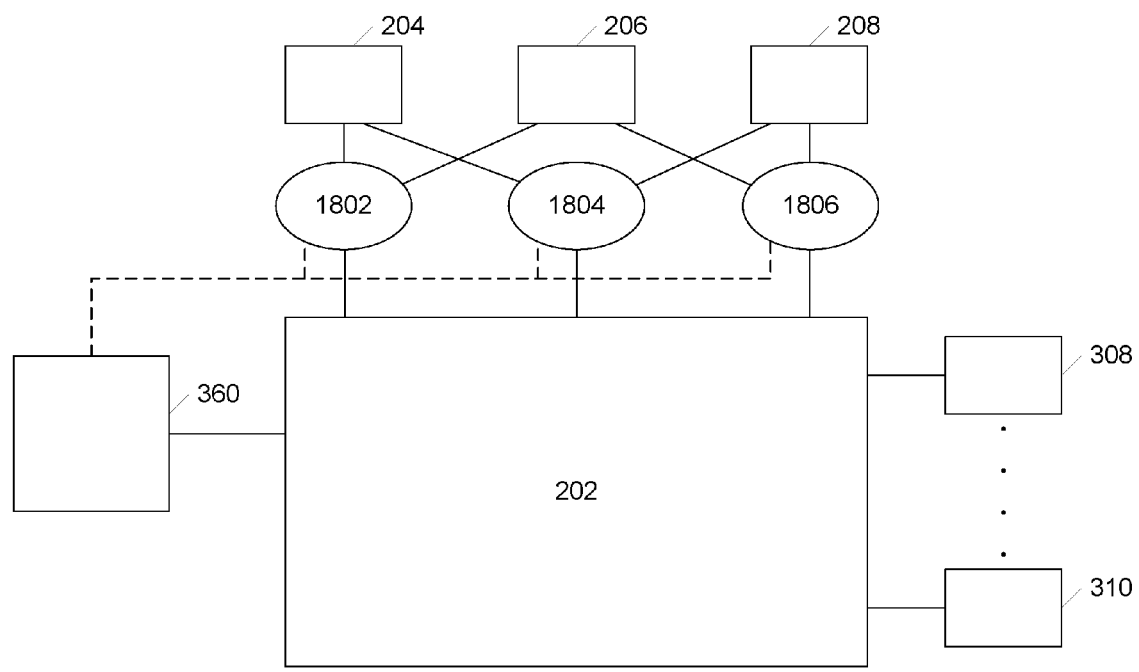
FIG. 18 is a diagram illustrating an example mobile community platform in accordance with another embodiment.

This type of arrangement is illustrated in FIG. 18. As can be seen, mobile platform 202 is interfaced with a plurality of mobile carriers, 204-208 through aggregators 1802, 1804, 1806. It will be understood that more or less carriers can be interfaced with mobile platform 202 via more or less aggregators and that number of carriers and aggregators illustrated in FIG. 18 is by way of example only and not intended to limit the embodiments described herein to specific numbers of carriers or aggregators. Further, it will be understood that some of aggregators 1802, 1804, 1806 will have contracts to provide messaging services with only certain of carriers 204, 206, 208 and may not have contracts to provide messaging services for all carriers 204, 206, 208. Similarly, mobile platform 202 may have contracts with each of aggregators 1802, 1804, 1806 to handle messages for only certain of carriers 204, 206, 208. Thus, aggregators 1802, 1804, 1806 can provide message routing and fee collection and allocation services for mobile users 224, 226, 228 when accessing the pods of mobile platform 202.

Aggregators 1802, 1804, 1806 can also be very sensitive to complaints associated with messages being provided via the application pods, because they do not want to risk being dropped as an aggregator by carriers 204, 206, 208. Accordingly, in certain embodiments, aggregators 1802, 1804, 1806 can use the services provided by content monitor 350 and accessed via content monitor portal 360.

The aggregator can then access the functions of FIG. 2 and illustrated in the screen shots of FIGS. 3-12; however, the information displayed will be with respect to the aggregator and not the carrier. Further, the thresholds of FIG. 11 can be provided per carrier per aggregator. In other words, an aggregator can select a higher threshold for one carrier versus another. When a carrier specific threshold for a certain aggregator is exceeded, then mobile platform 202 will not send any messages intended for a mobile user associated with the carrier originating from the offending pod through the particular aggregator. But mobile platform 202 may continue to send messages from the offending pod to user's associated with the specific carrier through another aggregator if the associated threshold for that aggregator has not been exceeded.

In other words, aggregators 1802, 1804, 1806 can define a threshold for each carrier 204, 206, 208 they are servicing. If aggregators 1802 and 1804 are both servicing carrier 204, then messages for users of carrier 204 can be routed through both aggregators 1802 and 1804. For example, a type of load balancing may be employed using both aggregators. In other embodiments, pricing may dictate which aggregator is used. If messages associated with a pod exceed the threshold set by aggregator 1802, the mobile platform 202 can automatically stop sending messages associated with the pod to users of carrier 204 through aggregator 1802; however, mobile platform 202 may still send messages associated with the pod to user's of carrier 204 through aggregator 1804, provided the threshold set by aggregator 1804 is not also exceeded.

It should be noted that the systems and methods described above and in related applications such as the '921 application should help ensure greater customer satisfaction, because for example the systems and methods ensure that the user is not billed unless they opt in and the user is billed the amount agreed upon. But in the event a particular pod still generates complaints, the aggregator, or carrier can simply shut down access to that pod. Thus, the carriers do not need to expend the resources required to deal with such situations, and the aggregators can preserve their relationships with the various carriers by eliminating a problem before it reaches a level where the carriers will start paying attention.

Another problem for aggregators is that content providers are constantly jumping from one aggregator to another, e.g., in an attempt to get better pricing. As a result, the aggregator's margins are constantly being squeezed. Accordingly, in certain embodiments, content providers can sign up and register pods to be made available by mobile platform 202 via an aggregator 1802, 1804, 1806. In other words, aggregators 1802, 1804, 1806 can offer, e.g., via a link on their web pages, the ability for content providers to provide content via an application pod and mobile platform 202.

Figure 16:
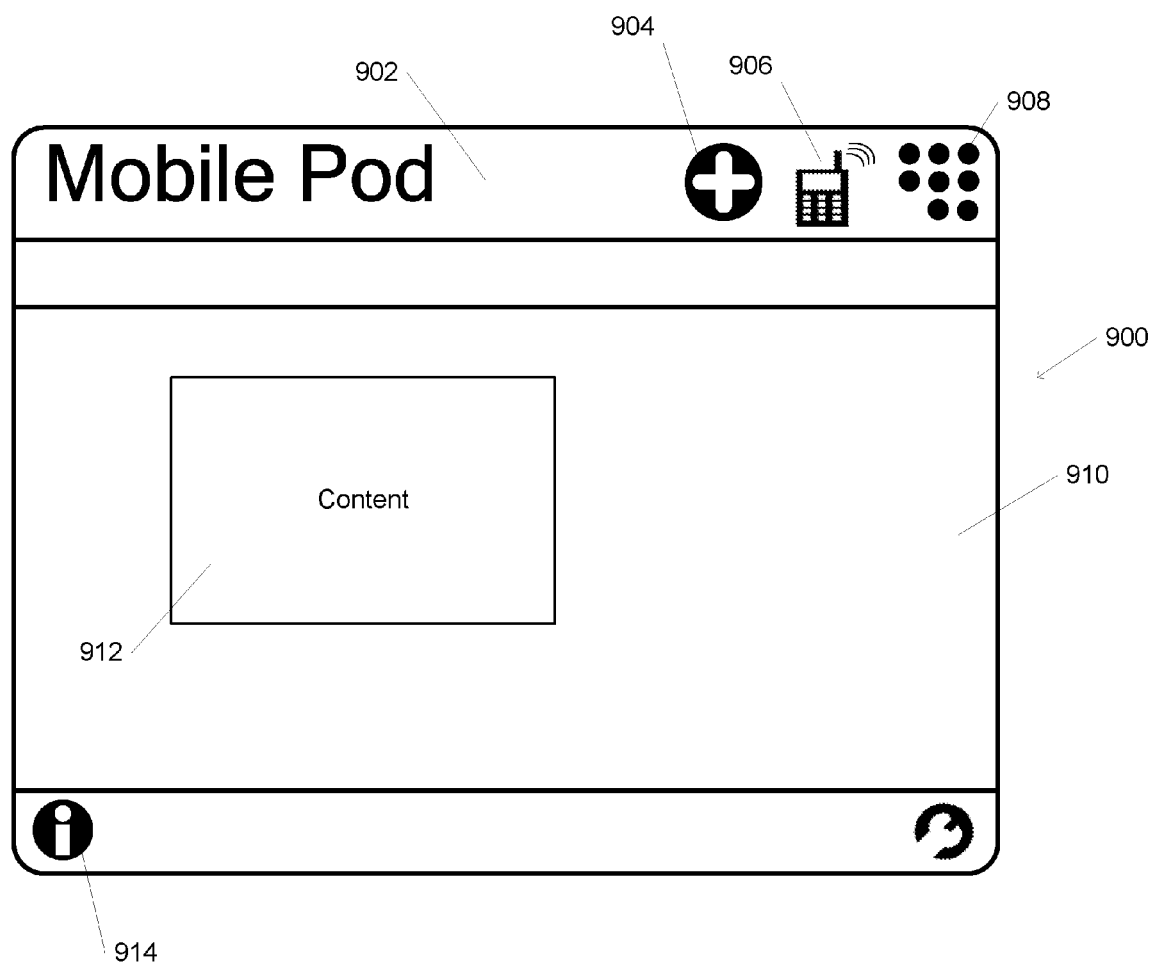
FIG. 16 is a diagram illustrating an example mobile pod in accordance with one embodiment.
Figure 17:
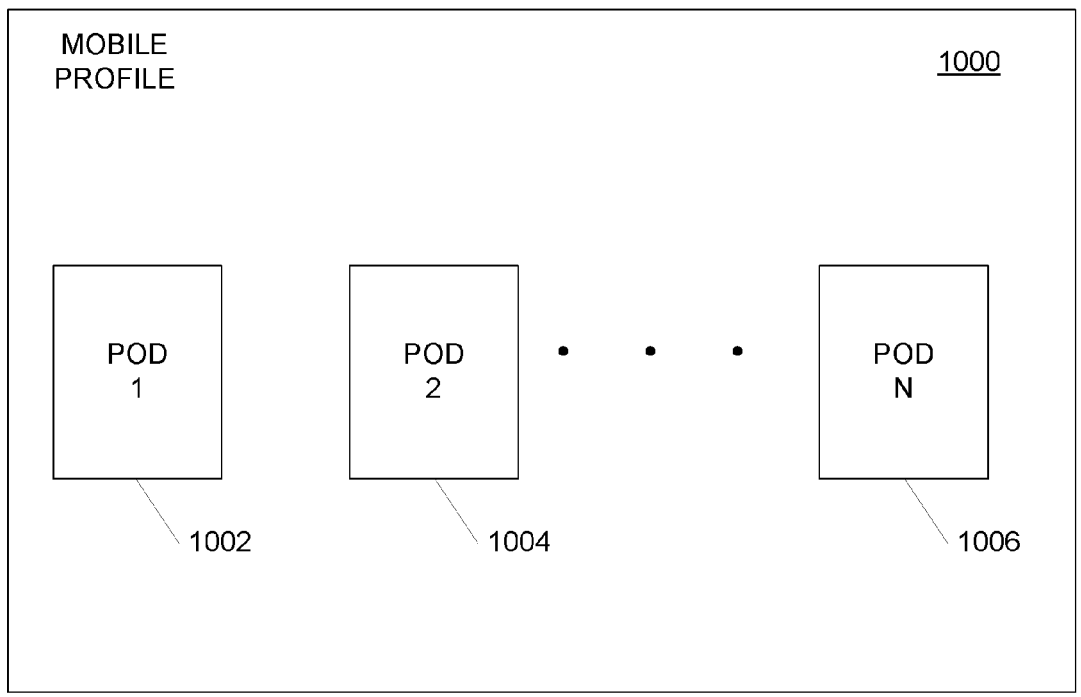
FIG. 17 is a diagram illustrating an example user profile page as presented by the mobile community platform of FIG. 13 in accordance with one embodiment.

For example, an aggregator can develop a marketing page that includes a link to mobile platform 202. When a content provider access the marketing page and clicks on the link, they will be interfaced with platform 202 where they can register their pod, e.g., in accordance with the process described in relation to FIG. 14. The content providers pod will then be made available as illustrated in FIGS. 16 and 17. In certain embodiments, all messages associated with that pod can then be routed through the aggregator through which the content provider accessed platform 202. In this manner, the aggregator can drive more messages, and therefore more revenue, through the aggregator's system.

In other embodiments, the aggregator can be paid an additional fee, e.g., 5% of the revenue assigned to mobile platform 202 and/or the content provider. In other embodiments, messages associated with the pod are not necessarily routed through the associated content provider, but the revenue share fee, e.g., 5%, can apply regardless of what aggregator the message is sent through. Thus for example, if messages are sent within a geographic area serviced by the aggregator, then the messages can be routed through the aggregator. But the messages can be routed through other aggregators in other geographic regions, thereby driving additional revenue for all parties involved.

In other words, in the embodiment of FIG. 18, each aggregator 1802, 1804, 1806 can be servicing a particular geographic region. All messages routed to at least certain carriers in the associated region can be route through the associated aggregator 1802, 1804, 1806; however, if a message being routed through one aggregator is related to a pod that was registered through one of the other aggregator's marketing pages, then the other aggregator can still get a share of the processing fee collected in association with the message.

Moreover, in certain embodiments, the pod can be permanently associated with the originating aggregator for the purpose of fee splitting/revenue sharing as described above. For example, even if the content provider of the pod jumps to another aggregator, which as explained above is very common, then the originating aggregator can still receive a share of the fees generated by that pod.

It should be noted that the systems and methods describe above are generally related to wireless network carriers and associated aggregators; however, as is mentioned above, mobile platform 202 can be configured to provide message and billing capabilities through a variety of systems and intermediaries, including non-mobile systems and intermediaries. Accordingly, the operators of these systems and/or intermediaries can have similar concerns about network-enabled applications that generate a lot of complaints and/or deactivation requests. Thus, the ability to suspend a network-based application as described above can also be made available to these non-mobile entities. Further, the non-mobile intermediaries can have the ability to sign up content providers and share in revenue generated by messages associated with the content provider's application in a manner similar to that described for mobile intermediaries.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A method for providing a plurality of network-enabled applications to a plurality of users via a social networking site and billing the plurality of users via a plurality of communication channels managed by a respective plurality of wireless network carriers, the method comprising:

on a social network site, establishing a user area associated with each of a plurality of users and making the plurality of network enabled applications available to the plurality of users through the user area associated with each user;

determining an associated wireless network carrier of a plurality of wireless network carriers for each of the plurality of users and billing each user for access to the plurality of network enabled applications via the associated wireless network carrier;

receiving, at a platform hosting the social network, a request originating from one of the plurality of wireless network carriers for a list of network-enabled applications being provided to users associated with the requesting wireless network carrier;

providing, by the platform, the list to the requesting wireless network carrier, the list including the name, user information, revenue information, and status of one or more listed network-enabled applications being provided to users associated with the requesting wireless network carrier;

receiving, at the platform, complaints associated with one or more of the plurality of network-enabled applications from one or more of the plurality of users; and updating, at the platform, status information for each of at least a subset of the one or more of the plurality of network-based applications based on the complaints.

2. The method of claim 1, further comprising comparing, at the platform, the number of complaints received for each of the one or more of the plurality of network-enabled applications with a pre-determined complaint threshold, and wherein the status is updated based on the comparison.

3. The method of claim 2, further comprising receiving, at the platform, complaint threshold information from at least one of the plurality of wireless network carriers.

4. The method of claim 2, further comprising disabling, by the platform, a network-enabled application for one of the plurality of wireless network carriers when the complaint threshold for the wireless network carrier is exceeded for the network-enabled application.

5. The method of claim 1, wherein the user information includes the total number of users for each of the one or more listed network-enabled applications being provided to users associated with the requesting wireless network carrier.

6. The method of claim 1, wherein the user information includes the number of activations in the current month for each of the one or more listed network-enabled applications being provided to users associated with the requesting wireless network carrier.

7. The method of claim 1, wherein the user information includes the number of de-activations for each of the one or more listed network-enabled applications being provided to users associated with the requesting wireless network carrier.

8. The method of claim 1, wherein the user information includes user ratings for each of the one or more listed network-enabled applications being provided to users associated with the requesting wireless network carrier.

9. The method of claim 1, wherein the revenue information includes the total revenue generated for the requesting wireless network carrier by each of the one or more network-enabled applications associated with the network managed by the requesting wireless network carrier.

10. The method of claim 1, wherein the revenue information includes the revenue generated in the current month for the requesting wireless network carrier by each of the one or more network-enabled applications associated with the requesting wireless network carrier.

11. The method of claim 1, wherein the revenue information includes the total revenue generated in the previous month for the requesting wireless network carrier by each of the one or more network-enabled applications associated with the requesting wireless network carrier.

12. The method of claim 1, further comprising for at least a subset of the plurality of network-enabled applications:
    receiving, at the platform, a set of registration data corresponding to the network-enabled application from a third party provider, the set of registration data including a link to an application location for accessing the network-enabled application;
    receiving, at the platform, a set of pricing structure data corresponding to the network-enabled application from the third-party provider;
    updating a system database in the platform to include the set of registration data corresponding to the network-enabled application and to include the pricing structure data corresponding to the network enabled application; and
    enabling the network-enabled application to be accessible to the plurality of users via a networked interface operated by the platform.

13. The method of claim 1, wherein the plurality of wireless network carriers includes a plurality of wireless network carriers and a plurality of intermediaries.

14. A method for providing a plurality of network-enabled applications to a plurality of users via a social networking site and billing the plurality of users via a plurality of communication channels managed by a respective plurality of wireless network carriers, the method comprising:
    on a social network site, establishing a user area associated with each of a plurality of users and making the plurality of network enabled applications available to the plurality of users through the user area associated with each user;
    determining an associated wireless network carrier of a plurality of wireless network carriers for each of the plurality of users and billing each user for access to the plurality of network enabled applications via the associated wireless network carrier;
    receiving, at a platform hosting the social network, a request originating from one of the plurality of wireless network carriers for a list of network-enabled applications associated with the requesting wireless network carrier;
    providing, by the platform, the list to the requesting wireless network carrier, the list including the name, user information, revenue information, and status of one or more listed network-enabled applications being provided to users associated with the requesting wireless network carrier;
    receiving, at the platform, one or more requests to de-activate at least one of the plurality of network-enabled applications from one or more of the plurality of users; and
    updating, at the platform, status information for the at least one network-based application based on the de-activation requests.

15. The method of claim 14, further comprising comparing, at the platform, the number of de-activation requests received for the at least one network-enabled application with a pre-determined de-activation request threshold, and wherein the status information is updated based on the comparison.

16. The method of claim 15, further comprising receiving, at the platform, de-activation request threshold information from at least one of the plurality of wireless network carriers.

17. The method of claim 15, further comprising disabling, by the platform, the at least one network-enabled application for one of the plurality of wireless network carriers when the de-activation request threshold for the wireless network carrier is exceeded for the network-enabled application.

18. The method of claim 14, wherein the user information includes the total number of users for each of the one or more listed network-enabled applications being provided to users associated with the requesting wireless network carrier.

19. The method of claim 14, wherein the user information includes the number of activations in the current month for each of the one or more listed network-enabled applications being provided to users associated with the requesting wireless network carrier.

20. The method of claim 14, wherein the user information includes a number of complaints received for each of the one or more listed network-enabled applications being provided to users associated with the requesting wireless network carrier.

* * * * *